Dec. 22, 1942. D. C. MOLLENHOUR ET AL 2,305,980
LEG FOR LITTERS
Filed July 24, 1941 5 Sheets-Sheet 1
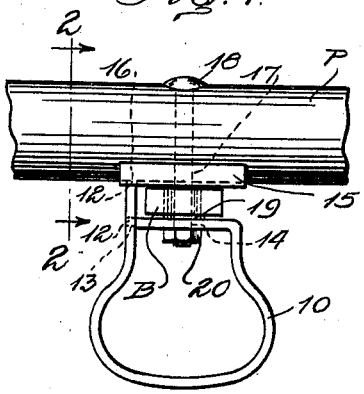
Fig. 1.
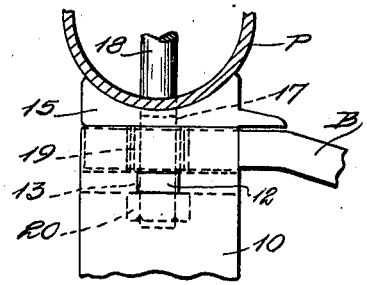
Fig. 2.
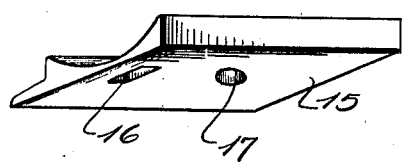
Fig. 3.
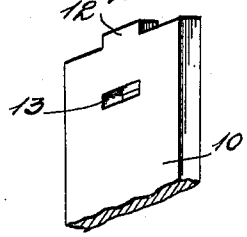
Fig. 4.
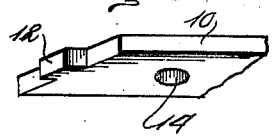
Fig. 5.
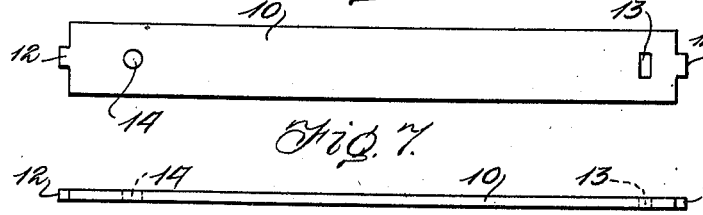
Fig. 6.
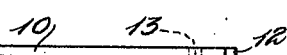
Fig. 7.
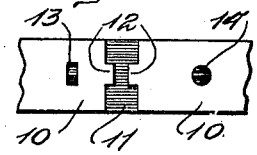
Fig. 8.
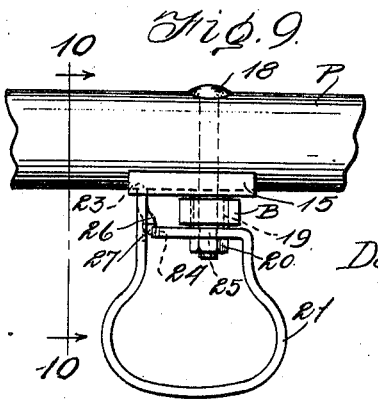
Fig. 9.
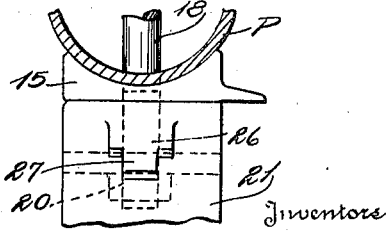
Fig. 10.
Inventors
Delbert Clark Mollenhour,
Samuel G. Thomson,
By 
Attorney

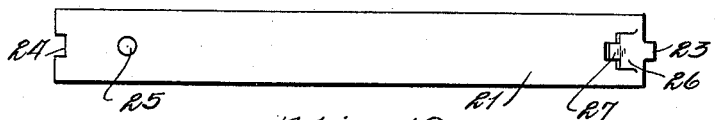
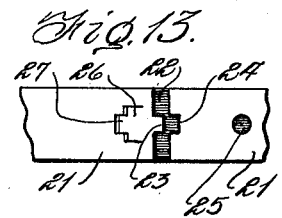
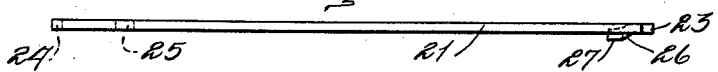
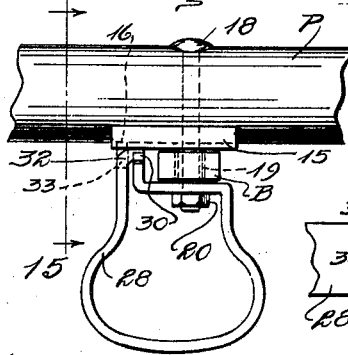
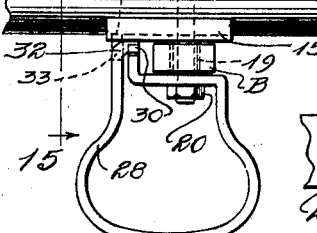
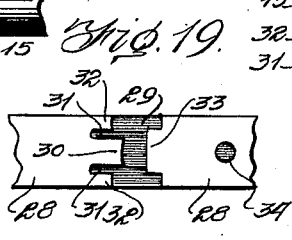
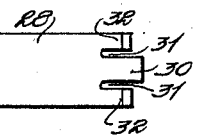
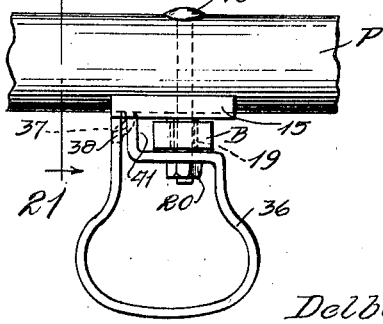
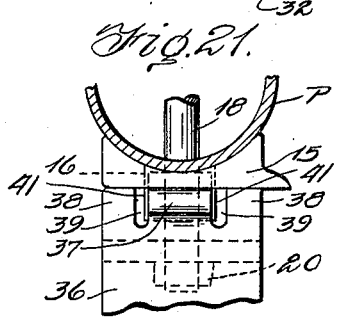

Dec. 22, 1942.  D. C. MOLLENHOUR ET AL  2,305,980
LEG FOR LITTERS
Filed July 24, 1941  5 Sheets-Sheet 3
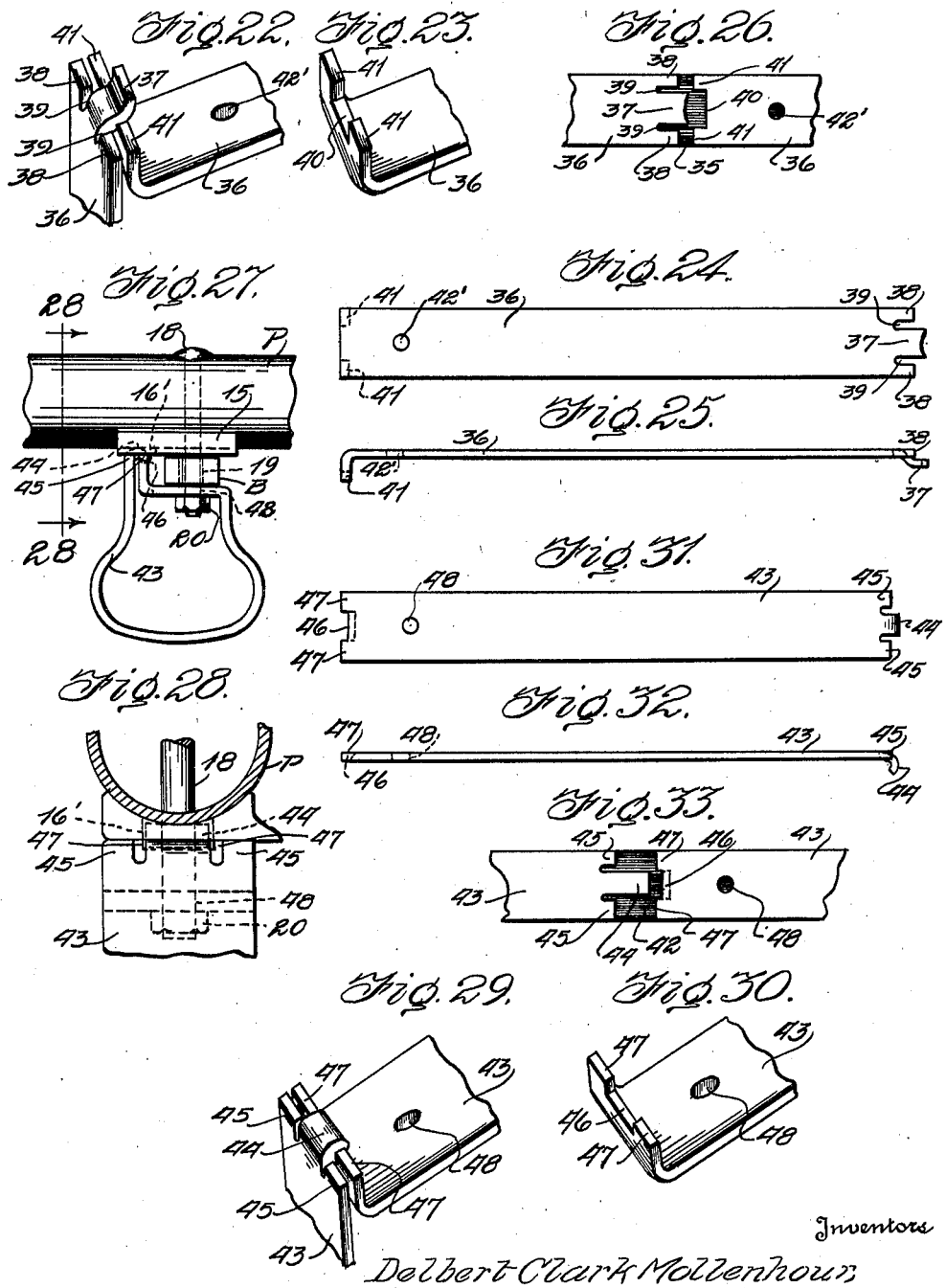

Dec. 22, 1942.   D. C. MOLLENHOUR ET AL   2,305,980
LEG FOR LITTERS
Filed July 24, 1941   5 Sheets-Sheet 4
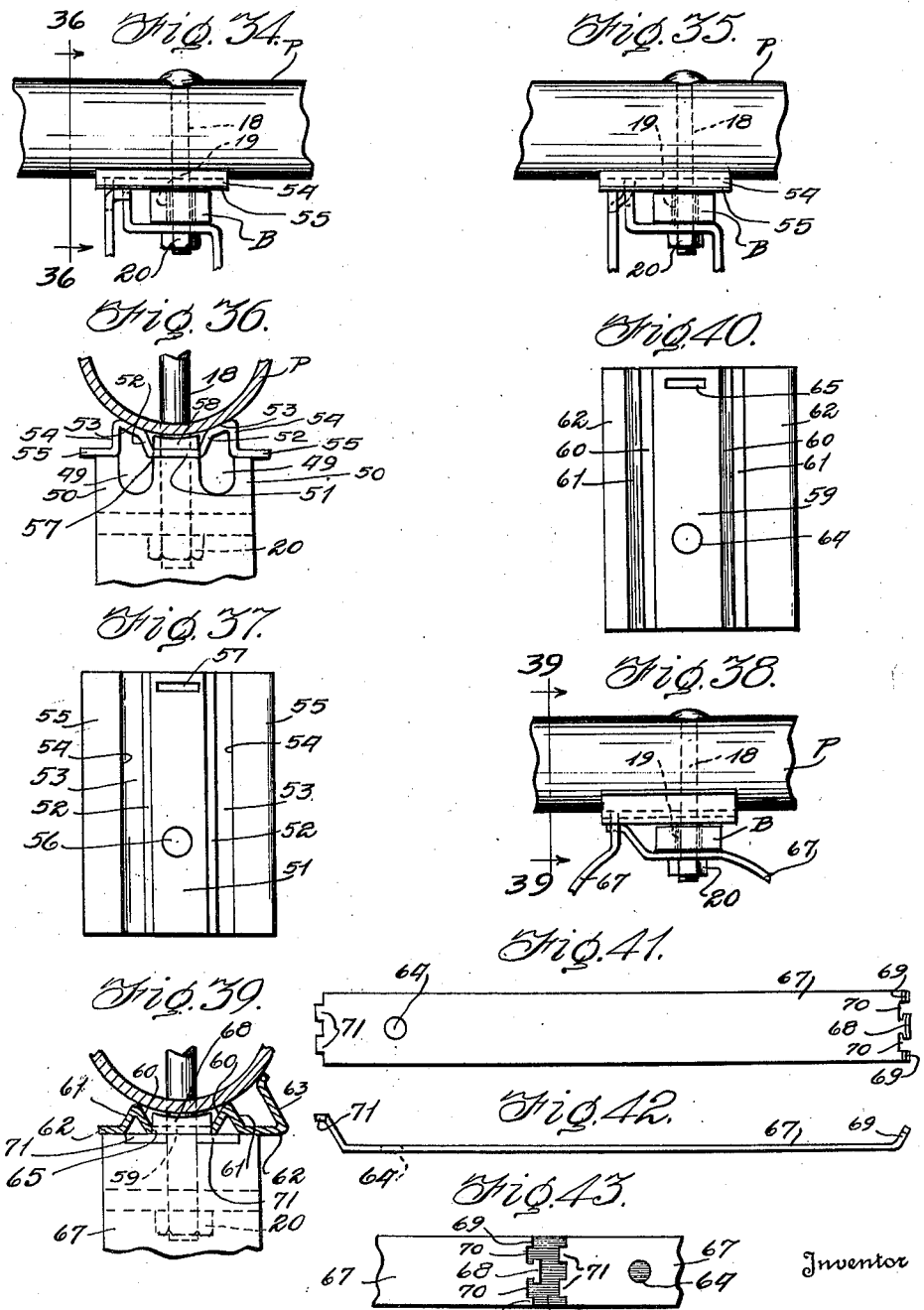
Inventor
Delbert Clark Mollenhour,
Samuel G. Thomson,
By
Attorney

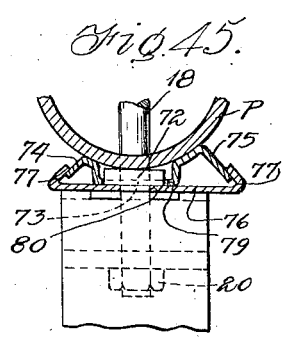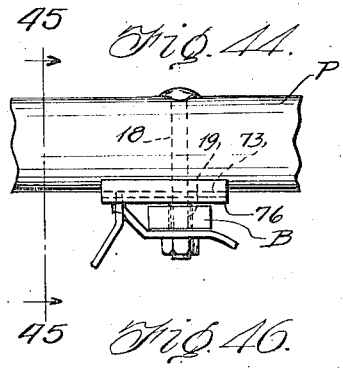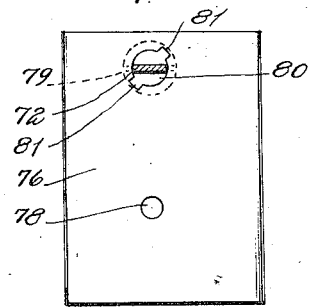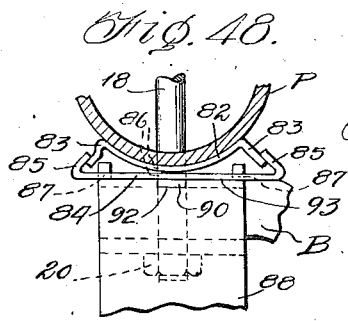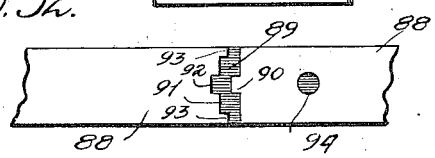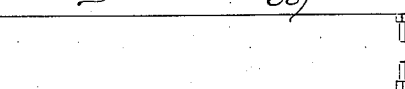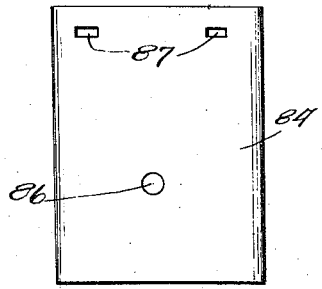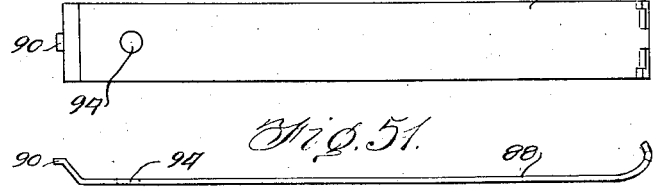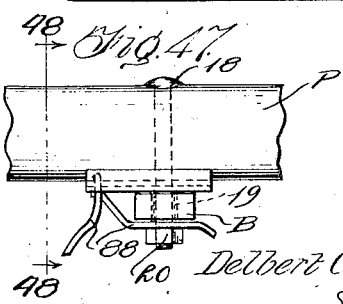

Patented Dec. 22, 1942

2,305,980

UNITED STATES PATENT OFFICE 2,305,980

LEG FOR LITTERS

Delbert Clark Mollenhour, Long Island, and Samuel G. Thomson, Flushing, N. Y., assignors to Zimmer-Thomson Corporation, Long Island, N. Y.

Application July 24, 1941, Serial No. 403,920

19 Claims. (Cl. 5—82)

This invention relates to folding litters such as are used for transporting sick and injured persons and has special reference to legs for folding litters.

More particularly the invention relates to improvements in the types of legs shown in Figures 10, 11 and 12 of the application for patent of Samuel G. Thomson, filed May 9, 1941, Serial Number 392,766, which became Patent No. 2,285,238 on June 2, 1942.

One important object of the invention is to provide novel and improved means for engaging or keying together the opposite end portions of a length of strip metal bent to form a litter leg.

A second important object of the invention is to provide novel and improved means for anchoring the formed strip to a pole saddle of the general type used in litters.

In order to attain great saving in material and to produce a very light weight structure it is desirable to use a very thin metal strip.

A third important object of the invention is to provide a novel arrangement for tying or securing the opposite ends of such a strip together, with the strip bent to form the leg, in a positive manner so as to resist excessive spring-like action due to the large sweeping curves in which the strip is bent to form the leg and also so as to prevent lateral movement of one end with respect to the other and thus afford a rigid construction capable of resisting blows or thrusts from the side.

Another requirement made necessary by the use of a very thin strip is the provision of a positive anchorage of one extremity of the strip to the saddle.

A fourth important object of the invention is to provide a novel and improved method of connecting one extremity of the leg to the saddle whereby a positive anchorage is effected which will prevent the anchored end from being sprung or jolted out of the comparatively shallow hole which can be formed in a light weight saddle by an unusually violent endwise blow or bump against the lower end of the leg such as may occur when the litter is slid along the floor or into an ambulance and the leg strikes an obstruction.

A fifth important object of the invention is to prevent, so far as possible, waste of material when cutting the strips used to form individual legs from a long strip of material.

It is to be noted that in order to save aluminum and magnesium for military aircraft construction, it may become necessary to use other metals entirely for the foot strip and saddle, in which use these parts must be designed with very light sections, so that a minimum weight is built into the litter; and, if plywood, plastic or other materials are used for the foot strip and saddle, it becomes all the more necessary to use the improvements embodied in this invention for the purposes described.

With the above and other objects in view, the invention consists in general of certain novel details of construction and combinations of parts hereinafter fully described, illustrated in the accompanying drawings and particularly pointed out in the appended claims.

In the accompanying drawings like characters of reference indicate like parts in the several views, and:

Figure 1 is a side elevation showing a portion of a litter pole, an improved saddle and one form of novel leg used therewith.

Figure 2 is an enlarged fragmentary section on the line 2—2 of Figure 1.

Figure 3 is a perspective of the saddle shown in Figure 1.

Figure 4 is a perspective view of the end of the strip which engages the saddle.

Figure 5 is a perspective view of the opposite end of the strip.

Figure 6 is a plan view of the strip before bending.

Figure 7 is an edge view thereof.

Figure 8 is a view showing diagrammatically the dieing or cutting arrangement for separating and punching individual lengths of strip metal.

Figure 9 is a view similar to Figure 1, but showing a second form of leg.

Figure 10 is an enlarged fragmentary section on the line 10—10 of Figure 9.

Figure 11 is a plan view of the strip of the second form of leg.

Figure 12 is an edge view thereof.

Figure 13 is a view similar to Figure 8 but showing the second form of strip.

Figure 14 is a view similar to Figure 1 but showing a third form of the invention.

Figure 15 is an enlarged fragmentary section on the line 15—15 of Figure 14.

Figure 16 is a plan view of the third form of strip before bending.

Figure 17 is an edge view thereof.

Figure 18 is an end view thereof.

Figure 19 is a view similar to Figure 8, but showing the third form of strip.

Figure 20 is a view similar to Figure 1 but showing a fourth form of the invention.

Figure 21 is an enlarged fragmentary section on the line 21—21 of Figure 20.

Figure 22 is a perspective view showing the connection of the two ends of the strip in the form shown in Figure 20.

Figure 23 is a similar view showing one strip end as shown in Figure 22.

Figure 24 is a plan view of the fourth form of strip before bending.

Figure 25 is an edge view thereof.

Figure 26 is a view similar to Fig. 8 but showing the fourth form of strip.

Figure 27 is a view similar to Figure 1 but showing a fifth form of the invention.

Figure 28 is an enlarged fragmentary section on the line 28—28 of Figure 27.

Figure 29 is a view similar to Figure 22 but showing the fifth form.

Figure 30 is a view similar to Figure 23 but showing the fifth form.

Figure 31 is a plan view of the fifth form of strip before bending.

Figure 32 is an edge view thereof.

Figure 33 is a view similar to Figure 8 but showing the fifth form of the invention.

Figure 34 is a side elevation of the upper part of a litter leg showing a modified form of litter pole seat and a leg similar to that shown in Figure 14 but slightly modified and constituting a sixth form of leg.

Figure 35 is a side elevation showing the use of the seat of Figure 34 with a slight modification of the leg shown in Figure 20.

Figure 36 is a section on the line 36—36 of Figure 34.

Figure 37 is a bottom plan view of the seat shown in Figures 36.

Figure 38 is a view similar to Figure 34 but showing a second modification of the litter pole seat and a seventh form of leg for use therewith.

Figure 39 is a section on the line 39—39 of Figure 38.

Figure 40 is a bottom plan view of the seat shown in Figure 38.

Figure 41 is a plan view of the seventh form of strip before bending.

Figure 42 is an edge view thereof.

Figure 43 is a view similar to Figure 8 but showing the seventh form of leg.

Figure 44 is a view similar to Figure 34 but showing a third modification of the pole seat as used with the seventh form of leg.

Figure 45 is a section on the line 45—45 of Figure 44.

Figure 46 is a bottom plan view of the pole seat shown in Figure 45.

Figure 47 is a view similar to Figure 45 but showing a fourth modification of the pole seat.

Figure 48 is a section on the line 48—48 of Figure 47.

Figure 49 is a bottom plan of the pole seat shown in Figure 48.

Figure 50 is a plan view of the eighth form of leg before bending.

Figure 51 is an edge view thereof.

Figure 52 is a view similar to Figure 8 but showing the eighth form of leg.

In each of the forms herein shown the leg is formed from a length of strip material of uniform width and thickness throughout cut and punched or drilled at its ends to form locking lugs and openings and then bent to form the leg. Similarly the saddle used is cut and punched from a long strip of uniform cross-section throughout and is punched or punched and drilled to form the necessary openings for co-action with the leg. The long strips from which the parts are made may be produced by extrusion, rolling or in any other desired manner.

In the form shown in Figures 1 to 8 the leg body 10 is severed from the long strip by punching out an I-shaped section 11, the waste or scrap being indicated in Figure 8 by horizontal line shading as is all other waste or scrap. This procedure leaves at each end of the strip a rectangular tab or lug 12 which lies in the plane of the body 10. Adjacent one end there is punched a rectangular opening 13 and adjacent the other end there is punched or drilled a bolt hole 14. The saddle 15 is formed on its upper side with a seat for a litter pole P which may be of any character, material and shape desired, the seat being shaped to conform to the particular pole used. The saddle is provided adjacent one end with a rectangular opening 16 of such size as to receive the lug 12 adjacent the opening 13 of the strip and the opening 13 is of such size as to receive the lug 12 adjacent the opening or bolt hole 14. A bolt hole 17 is formed in the saddle and the distance of the bolt hole 17 from the opening 16 equals the distance of the bolt hole 14 from the adjacent lug 12. With the strip for the leg body thus prepared the strip is bent to leg form as in Figure 1 and the lug 12 adjacent the bolt hole 14 inserted in the opening 13. The pole P is placed on the saddle and a bolt 18 is passed downwardly through the pole and through a spacer thimble 19. The leg is then slipped on the projecting end of the bolt 18, the latter passing through the bolt hole 14 and the lug 12 adjacent the opening 13 is inserted in the opening 16. A nut 20 is now applied to the end of the bolt and screwed up so that the stretcher pole, saddle and leg are firmly secured together. It is to be noted that a toggle bar B for laterally stretching the litter has one end mounted on the thimble prior to the above described assembly. With this construction the formed leg is provided with a horizontal portion parallel to the bottom surface of the saddle so that the toggle bar may have the necessary swinging movements.

In the form of the invention shown in Figures 9 to 13 the body 21 is severed from the long strip by punchings 22 (Figure 13) of zig-zag form to provide a lug 23 on one end of the body and a notch 24 in the other end. Adjacent the notch 24 the body is provided with a bolt hole 25. Adjacent the lug 23 the body is slit to provide a tab 26 extending away from the lug 23 and formed centrally of its free edge with a lug 27 of such size as to fit the notch 24. The tab and lug are bent to lie out of the plane of the body as shown in Figures 9 and 12. The leg member is now bent to form with the lug 27 engaged in the notch 24. Assembly with the stretcher pole, saddle, spacer thimble and toggle bar is carried out as with the first form of leg, the lug 23 engaging in the saddle opening 16.

In the form shown in Figures 14 to 19 the body 28 is severed from the long strip by an irregular punching 29 (Figure 19) which causes the formation at one end of the body of a rectangular lug 30 of a size to fit the opening 16 of the saddle previously described. The punching operation also provides a pair of slots 31 between the sides of the lug 30 and the side edges of the strip so that the lug 30 lies between a pair of tongues 32. This punching also forms at the other end of the body a lug 33 of such width as to fit neatly between the tongues 32 in the completed leg. In this form the tongues 32 have their extremities bent at right angles to the body so that the lug 30 will project beyond these tongues. The other end of the severed strip is also bent at right angles to the body but in a direction opposite the tongues 32. The severed strip is now bent to leg form and, in so doing, the lug 33 engages between the tongues 32. The body is provided with the usual bolt hole 34 and the assembly is effected as in the previous forms, the lug 30 entering the opening 16.

In the form shown in Figures 20 to 26 the same form of saddle is again used. In this form an irregular punching 35 divides the long strip in body portions 36, these punchings forming at one end of the body a lug 37 and pair of tongues 38 separated from the lug by slots 39. The tongues 38 are, in this form, somewhat shorter than the lug 37. The other end of the bar is provided with a notch 40 of such size as to snugly receive the lug 37. The lug 37 has its free end offset from the body by a reverse bend and the opposite end of the body is bent so that the lugs 41 at the sides of the notch 40 project in the same direction as the offset of the lug 37. When this form is bent to leg shape the lug 37 projects above the lugs 41 and ends of the tongues 38. In assembly, which is performed as before, the projecting end of the lug 37 engages in the opening 16 of the saddle and the ends of the tongues 38 and lugs 41 butt against the under face of the saddle 15. The usual bolt hole 42' is provided in this form.

In the form of the device shown in Figures 27 to 33 the same type of saddle is used except that the opening 16 is replaced by a wider opening 16'. The punched out waste or scrap 42 is of similar form to that shown in Figure 26 but here the result is to form, at one end of the body 43, a long lug 44 and two short tongues 45. The other end has a notch 46 providing two short tongues 47. The usual bolt hole 48 is also provided. When the body is bent to leg form the lug 44 is so bent as to extend upward, upon assembly, as before but its extremity bends down and engages in the notch 46.

It will now be seen that in each of the forms here shown the leg is formed from a single strip of material of uniform width and thickness which is provided at its end portions with interlocking means integral with the strip. Also, it will be seen that, in each form, the strip is provided with a lug engageable in an opening in a saddle block to prevent turning of the leg on the bolt connecting it to the saddle. Furthermore, it will be seen that, in the forms shown in Figures 22 and 29 the lug entering the saddle opening constitutes interlocking means with the coacting means at the other end of the strip.

In the form of the invention shown in Figures 34 to 37 the leg sections are severed from the long strip in the manner shown generally in Figures 19 and 26, the only difference being that the slots 31 and 39 are replaced by wider slots 49 and the tongues formed thereby are narrower as at 50. In these figures the litter pole P rests on seats each made of a thin sheet of metal or other suitable material stamped, rolled or otherwise formed to shape. When formed the sheet has a flat central portion 51 extending longitudinally of the pole and at each side edge of the portion 51 is an upstanding rib 52. From the upper edges of the ribs 52 the material extends outwardly and upwardly to form rests 53 for the pole. From the outer edges of the portions 53 the material extends downwardly to form outer ribs 54 and from the bottoms of these ribs extend flanges 55 which are coplanar with the center portion 51. The central portion is provided with a bolt hole 56 and with a slot 57 spaced from the hole to receive the upstanding lug 58 of the leg. Thus this construction provides a sheet material litter pole seat having a flat central portion, a pair of parallel upstanding pole engaging ribs and a pair of lateral flanges coplanar with the central portion.

In the forms shown in Figures 38 to 43 special coacting means are used to lock the pole seat and leg together and to this end the pole seat is formed from sheet material as in the last mentioned form. The formed piece of sheet material provides a flat central portion 59 from each side of which the material extends upwardly and outwardly as at 60 and then downwardly and outwardly as at 61 to form a pair of inverted V-shaped ribs. From the bottom edges of the portions 61 extend flanges 62 which are coplanar with the central portion. One of these flanges is wider than the other and from the outer edge of the wider flange the material extends upwardly and inwardly to form a brace 63. This seat has a bolt hole 64 and is also provided with an opening 65. With this form of seat a special leg is used, the sections of which are divided from a long strip by irregular punchings as at 66 to provide bodies 67. The punching 66 is of such shape as to provide on one end of each body a centrally disposed T-shaped lug 68 and a pair of tongues 69 spaced at opposite sides of the lug to provide slots 70. The other end of the body is provided with a pair of spaced lugs 71 so disposed and of such width as to fit in the slots 70 upon the strip being bent to leg form with their inner edges engaging beneath the arms of the T. The usual bolt hole 64 is provided. In this form the head of the T-shaped lug 68 engages in the slot 65 when the parts are assembled.

In the form of the invention shown in Figures 44 to 46 the leg of the last described form is used but is slightly modified by having the lug 68 somewhat longer as shown in Figure 45 at 72. In the saddle used with this form the construction employs a pair of members made from sheet material. One of these members is formed to provide a flat central portion 73 having at its sides ribs 74 and 75 similar to the ribs of Figure 36 but with the rib 75 wider than the rib 74. The other of the members forms a flat body 76 provided with inwardly inclined lateral flanges 77 which grip over the outer faces of the ribs 74 and 75 and thus hold the two members together. These members are provided with registering bolt holes 78. The upper member first described has a circular opening 79 therein, the diameter of which is slightly greater than the width of the head of the T-shaped lug 72. The other member has a smaller circular opening 80 of slightly greater diameter than the width of the lug stem and at diametrically opposite points of this opening are notches 81 disposed diagonally of the saddle. With this construction in the assembly of the leg and saddle the head of the lug is passed up through the slots 81 with the leg and saddle bolt holes out of alignment. The leg is then swung to align said bolt holes and this causes the arms of the T-shaped lug to engage on top of the plate 76 thus preventing disengagement of the parts. The assembly is completed in the usual manner.

In the form of saddle shown in Figures 47 to 49 two pieces of sheet material are used as in the form shown in Figure 45. However in Figure 48 the upper member has a central portion 82 of arcuate cross-section to conform to the round pole P and at each side of this central portion there is provided an outwardly and downwardly extending flange 83. The lower member consists of a flat plate 84 having at its side edges upwardly converging flanges 85 which overlap the flanges 83 with the portion 82 resting on the plate 84. The plate 84 and portion 82 are provided with registering bolt holes 86 and the plate 84 is also provided with a pair of openings 87 arranged opposite each other. The leg for this form is like the other legs above described except at the ends, the leg bodies 88 being severed from a long strip by punchings such as are shown at 89. The shape of the punching is such as to provide a centrally disposed projecting lug 90 at one end and a wide shallow notch 91 at the other end having the portion opposite the lug 90 deepened as at 92 to receive this lug. The notch 91 provides a pair of lugs 93 at the sides of the body 88 and, when the body is bent to leg form with the lug 90 in the notch 92, the lugs 93 are engaged in the openings 87 of the saddle. The body 88 is provided with the usual bolt hole 94 and the assembly of the leg and saddle is effected in the same manner as all but the form just previously described.

What is claimed, is:

1. A litter leg consisting of a single strip of material of uniform cross-section, said strip being bent to form a litter leg and having its ends provided with interlocking means integral with the strip.

2. A litter leg consisting of a single strip of material of uniform cross-section, said strip being bent to form a litter leg and having its ends provided with interlocking means integral with the strip, the interlocking means at one end constituting a tongue and the remaining end being provided with tongue receiving means.

3. A litter leg consisting of a single strip of material of uniform cross-section bendable to form a leg and having an integral tongue at one end and an opening for receiving the tongue upon bending to form the leg, said opening being adjacent the other end.

4. A litter leg consisting of a single strip of material of uniform cross-section bendable to form a leg and having an integral tongue at one end and a notch at its other to receive the tongue upon bending of the strip to form the leg, said strip being bent to form a litter leg and having the tongue engaged in said notch.

5. In combination, a litter pole seat having an opening therein, a litter leg formed from a single length of strip material of uniform cross-section throughout and provided at one end with a lug adapted to enter said opening, said strip being bent to form a litter leg and having its lug engaged in said opening, the remaining end of the strip being provided with integral means interlocking with the first end, and means to secure the leg to the pole seat with the lug in said opening.

6. In combination, a litter pole seat having an opening therein, a litter leg consisting of a flat strip of uniform cross-section throughout and bent to leg shape with its extremities in proximity, one end of said strip being provided with a lug engaging in said opening and the other end of the strip being provided with a notch receiving said lug, and means to hold the pole seat and leg together with the lug in the opening.

7. A litter leg consisting of a flat strip of uniform cross-section throughout and bent to leg shape with its ends in proximity, one end of said strip being provided with a lug adapted to enter an opening in a pole seat, and other integral and coacting means on the ends of the strip holding the strip ends against relative movement.

8. A litter leg consisting of a flat strip of uniform cross-section throughout and bent to leg shape with its ends in proximity, said strip having a lug formed at each end, one of said lugs being adapted to enter an opening in a litter pole saddle, the strip at the end provided with the saddle engaging lug being also provided with means for engagement with the remaining lug.

9. A litter leg consisting of a flat strip of uniform cross-section throughout and bent to leg shape with its ends in proximity, said strip having a lug projecting from one end and having a centrally disposed lug and a pair of tongues projecting from the other end and engaging the first mentioned lug, said centrally disposed lug being adapted to enter an opening in a litter pole saddle.

10. A litter leg consisting of a flat strip of uniform cross-section throughout and bent to leg shape with its ends in proximity, said strip having a notch in one end and a lug projecting from its other end and offset to engage in said notch with the end of the lug projecting from the notch and adapted to enter an opening in a litter pole saddle.

11. A litter leg consisting of a flat strip of uniform cross-section throughout and bent to leg shape with its ends in proximity, said strip having a notch in one end and a lug projecting from its other end and offset to engage in said notch with the end of the lug projecting from the notch and adapted to enter an opening in a litter pole saddle, said strip further having a pair of tongues on opposite sides of the lug and adapted to engage against the under face of the saddle.

12. A litter leg consisting of a flat strip of uniform cross-section throughout and bent to leg shape with its ends in proximity, said strip having a notch in one end and a lug projecting from its other end and rebent to have its extremity engaged in said notch, the bend of said lug being adapted to enter an opening in a litter pole saddle.

13. A litter leg consisting of a flat strip of uniform cross-section throughout and bent to leg shape with its ends in proximity, said strip having a notch in one end and a lug projecting from its other end and rebent to have its extremity engaged in said notch, the bend of said lug being adapted to enter an opening in a litter pole saddle, said strip further having a pair of tongues on opposite sides of the lug and to abut against the under face of the saddle.

14. A litter pole saddle consisting of a piece of sheet material of suitable rigidity formed to provide a central portion, parallel upstanding ribs at the sides of the central portion for engagement with a litter pole, and flanges extending outwardly from said ribs coplanar with the central portion, said central portion having a bolt hole and a lug receiving portion formed therein.

15. A litter pole saddle consisting of a piece of sheet material of suitable rigidity formed to provide a central portion, parallel upstanding ribs at the sides of the central portion for engagement with a litter pole, flanges extending outwardly from said ribs coplanar with the central portion, and a brace flange extending upwardly and inwardly from the outer edge of one of said flanges to engage the litter pole, said saddle having a bolt hole between said ribs whereby to receive a bolt securing the saddle to a litter pole with the ribs engaging the pole.

16. A litter leg consisting of a flat strip of uniform cross-section throughout and bent to leg shape with its ends in proximity, said strip having a T-shaped lug extending centrally from one end and having a pair of tongues projecting parallel to the lug at the sides of the strip, said strip having a pair of spaced lugs projecting from its other end and engaged beneath the arms of the T-shaped lug and between the stem of the latter and the tongues, and a bolt passing through the strip adjacent said lugs and securing the leg to a litter pole.

17. The combination with a litter pole saddle having a bolt hole and a pair of laterally spaced leg lug receiving openings, of a leg having a corresponding bolt hole and a pair of lugs adapted to enter the openings in the saddle when the said bolt holes are aligned.

18. A litter pole saddle including upper and lower sheet material members, said upper member comprising a flat central portion having a bolt hole and a leg lug receiving opening spaced therefrom, and a pair of lateral ribs having outwardly flaring outer sides, said lower member comprising a flat central portion having a bolt hole and opening registering with the like parts in the upper member, and a pair of inwardly inclined lateral flanges engaging over the outer sides of said ribs.

19. A litter pole saddle including upper and lower sheet material members, said upper member comprising a flat central portion having a bolt hole and a leg lug receiving opening spaced therefrom, and a pair of lateral ribs having outwardly flaring outer sides, said lower member comprising a flat central portion having a bolt hole and opening registering with the like parts in the upper member, and a pair of inwardly inclined lateral flanges engaging over the outer sides of said lateral ribs.

DELBERT CLARK MOLLENHOUR.
SAMUEL G. THOMSON.